Patented Aug. 27, 1929.

1,726,323

UNITED STATES PATENT OFFICE.

EDMUND STEIL, OF BERLIN, GERMANY, ASSIGNOR TO AMERICAN GASACCUMULATOR COMPANY, OF ELIZABETH, NEW JERSEY, A CORPORATION OF NEW JERSEY.

POROUS MASS AND METHOD OF MAKING SAME.

No Drawing. Application filed October 22, 1925, Serial No. 64,275, and in Germany November 1, 1924.

This invention relates to porous masses which are adapted for the storage of explosive gases, such as acetylene.

Attempts have been made heretofore to employ porous organic substances, such as cellulose, kapok, silk, wood sawdust, cotton, peat, animal hair and the like in the manufacture of such masses, but such attempts have not proved to be satisfactory or successful. Experience has shown that in the case of local explosions of a gas within such masses charring and destruction thereof take place, as a result of which the mass fails to prevent decomposition of the gas. In practice these masses are packed into steel tanks or receivers and associated therewith and thoroughly distributed therethrough is a liquid solvent, such as acetone, for the gas. The gas, such as acetylene, is charged into the tank or receiver under pressure and is dissolved by the liquid, the gas being adapted to be delivered from the tank or receiver upon release of the pressure.

One object of the invention is to provide a porous mass of organic substance in which the constituent particles thereof are intimately associated and combined with a metallic compound whereby a mass is produced which is heat resistant and whereby charring and destruction of any portion of the porous mass, due to a local explosion of a gas within the mass in a receiver, is prevented.

Another object of the invention is to provide a novel method by the employment of which a mass embodying the invention may be economically and efficiently produced.

Other objects of the invention will become apparent from the detailed description thereof which follows.

In order that the organic substance which may be employed, such as one of those beforementioned or a mixture of the same, shall be free from any substance or ingredient which might react, either with the liquid solvent or with the gas, to produce deleterious effects upon the latter, such organic substance should be thoroughly cleansed before employment or use in the formation of the mass. Thereafter it is saturated with a solution of a metallic salt, such as zinc or copper chloride. The organic mass, having been thus treated, is thereafter treated with a solution of resin soap, or with a solution either of barium sulphide or ferrous sulphate. The reaction between such metallic salt upon the organic fibers and a resin soap solution, or a solution of barium sulphide or ferrous sulphate produces a compound of suitable character in association with the particles or fibers of the said organic substance in such manner as to render the same heat resisting or incombustible so that charring or destruction thereof is prevented in case of a local explosion of the gas within the mass in a tank or receiver.

The order or succession of the steps taken in the carrying out of the method of treating organic substances such as those above mentioned or others which may be found to be suitable for the purpose, or a mixture thereof, is immaterial and such order or succession may be followed as may by found most suitable for each particular mass or substance. The essential thing is that the metallic compound which constitutes the heat resisting substance and which may be precipitated or formed upon the constituent particles or fibers of the organic substance shall be in such intimate association therewith as to prevent charring or destruction thereof in case of an explosion of a gas within the mass. The metallic compound which is formed or produced in intimate association with the organic substance should be in a finely divided state.

One other advantage of the invention is that the precipitation or formation of a metallic compound of the character indicated within and upon the fibers of the organic substance of the porous mass results in the diminution of the size of the pores of the mass whereby their capillarity is increased, thereby increasing the effectiveness of the mass to prevent the explosion of the gas therein.

Although I have referred particularly to certain metallic compounds which may be employed in the carrying out of the method for the treatment of organic substances in the manufacture of porous masses, I desire it to be understood that my invention is not limited to the metallic compounds mentioned. Any suitable metallic compounds which will not act deleteriously upon the gas or will not act to decrease the efficiency of the mass, and which are of a character to become intimately associated with the constituent particles or fibers of the organic substance to form a protective means therefor may be employed.

Having thus described my invention, what I claim and desire to secure by Letters Patent is:

1. The method of producing a porous mass for the storage of explosive gases, such as acetylene, which comprises the treatment of a suitable porous organic substance with a solution of copper chloride in sufficient quantity to saturate the same, and thereafter treating the mass so treated with a solution of ferrous sulphate.

2. A porous mass for the storage of explosive gases comprising a porous organic substance adapted for such masses, the constituent particles of which are impregnated with a metallic compound consisting of a precipitant produced by the reaction between copper chloride and ferrous sulphate.

In testimony that I claim the foregoing as my invention, I have hereunto signed my name this 9th day of October, 1925.

EDMUND STEIL.